(12) United States Patent
Kokal et al.

(10) Patent No.: US 9,547,797 B2
(45) Date of Patent: Jan. 17, 2017

(54) MANAGING VEHICULAR TRAFFIC ON A ROADWAY

(71) Applicant: HOVTag LLC, Dallas, TX (US)

(72) Inventors: James Vincent Kokal, Plano, TX (US); Mark Alan Smith, Colleyville, TX (US); Ron Natinsky, Dallas, TX (US); James Alan Chase, Plano, TX (US)

(73) Assignee: HOVTag LLC, Dallas, TX (US)

( * ) Notice: Subject to any disclaimer, the term of this patent is extended or adjusted under 35 U.S.C. 154(b) by 37 days.

(21) Appl. No.: 14/255,856

(22) Filed: Apr. 17, 2014

(65) Prior Publication Data

US 2014/0313057 A1    Oct. 23, 2014

Related U.S. Application Data

(60) Provisional application No. 61/812,722, filed on Apr. 17, 2013.

(51) Int. Cl.
*G08G 1/00* (2006.01)
*G06K 9/00* (2006.01)
*G07B 15/06* (2011.01)

(52) U.S. Cl.
CPC ......... *G06K 9/00838* (2013.01); *G07B 15/063* (2013.01)

(58) Field of Classification Search
CPC ... G06K 9/00369; G07B 15/063; G07B 15/06; G08G 1/0175
USPC .................................. 340/932, 937, 938, 928
See application file for complete search history.

(56) References Cited

U.S. PATENT DOCUMENTS

| | | | |
|---|---|---|---|
| 7,081,819 B2 | 7/2006 | Martinez de Velasco Cortina et al. | |
| 7,548,153 B2 | 6/2009 | Gravelle et al. | |
| 8,229,624 B2 | 7/2012 | Breed | |
| 8,280,791 B2 | 10/2012 | Davis, III et al. | |
| 8,314,687 B2 | 11/2012 | Gravelle et al. | |
| 8,779,921 B1* | 7/2014 | Curtiss | G08B 25/009 340/506 |
| 8,811,664 B2* | 8/2014 | Dalal | G06K 9/00362 382/103 |

(Continued)

FOREIGN PATENT DOCUMENTS

| | | |
|---|---|---|
| EP | 1 114 304 | 7/2001 |
| KR | 10-2009-0022969 A | 3/2009 |
| KR | 10-2012-0116882 A | 10/2012 |

OTHER PUBLICATIONS

International Search Report date mailed Aug. 25, 2014; International Application No. PCT/US2014/034566.

(Continued)

*Primary Examiner* — Eric M Blount
(74) *Attorney, Agent, or Firm* — McGuireWoods LLP

(57) ABSTRACT

A system for managing vehicular traffic on a roadway includes a sensing unit positioned within a vehicle traveling on the roadway. The sensing unit is configured to determine occupancy data based on the number of passengers within the vehicle. An ambient light sensor is operatively associated with the sensing unit such that upon sensing an intensity of ambient light, an adjustment is made to the system to aid in the determination of occupancy data. The occupancy data is configured to be communicated to one or more receiving units positioned above or proximate the roadway.

8 Claims, 5 Drawing Sheets

(56) References Cited

U.S. PATENT DOCUMENTS

| | | | |
|---|---|---|---|
| 9,007,438 B2* | 4/2015 | Mestha | G01S 17/89 |
| | | | 348/143 |
| 2002/0175815 A1* | 11/2002 | Baldwin | G01S 13/04 |
| | | | 340/567 |
| 2005/0012600 A1 | 1/2005 | Huang | |
| 2006/0015394 A1* | 1/2006 | Sorensen | G07B 15/063 |
| | | | 340/928 |
| 2008/0175438 A1* | 7/2008 | Alves | G08G 1/0175 |
| | | | 382/105 |
| 2008/0234899 A1* | 9/2008 | Breed | B60N 2/002 |
| | | | 701/47 |
| 2010/0085213 A1* | 4/2010 | Turnock | G08G 1/017 |
| | | | 340/928 |
| 2010/0295946 A1* | 11/2010 | Reed | H05B 37/0227 |
| | | | 348/164 |
| 2012/0126939 A1 | 5/2012 | Chang | |
| 2012/0143786 A1* | 6/2012 | Karner | G06Q 30/0283 |
| | | | 705/400 |
| 2014/0032098 A1* | 1/2014 | Anderson | G01C 21/3658 |
| | | | 701/428 |
| 2014/0074566 A1 | 3/2014 | McCoy et al. | |
| 2014/0180773 A1* | 6/2014 | Zafiroglu | G06Q 30/0207 |
| | | | 705/13 |
| 2014/0278841 A1* | 9/2014 | Natinsky | G07B 15/063 |
| | | | 705/13 |

OTHER PUBLICATIONS

Yebes, et al. "Occupant Monitoring System for Traffic Control in HOV Lanes and Parking Lots", [date unavailable], Mar. 17, 2013.

Turnbull, KF. "Twelfth (12th) International HOV Systems Conference: Improving Mobility and Accessability with Managed Lanes, Pricing, and BRT. Conference Proceedings Apr. 18-20, 2005, Houston, Texas." (2007).

Flexpoint Sensory Systems, Inc.—Seat Occupant Detection; http://www.flexpoint.com/sensorApps/automotive/seatOccupantDetection.htm; 2005.

* cited by examiner

MANAGING VEHICULAR TRAFFIC ON A ROADWAY

CROSS-REFERENCE TO RELATED APPLICATIONS

This application claims the benefit of and priority to U.S. Provisional Application No. 61/812,722, filed Apr. 17, 2013, which is hereby incorporated by reference.

FIELD OF DISCLOSURE

The present disclosure generally relates to systems and methods for managing vehicular traffic on a roadway.

BACKGROUND

Vehicular traffic on roadways continues to increase as populations increase and become more concentrated in certain areas, particularly urban locations. Many urban jurisdictions have constructed special lanes or implemented methods to reduce vehicle traffic and congestion. Among these, high occupancy vehicle (HOV) lanes encourage higher occupancy within vehicles, thereby decreasing the number of vehicles on roads. HOV lanes traditionally have permitted access to segregated and less populated lanes by vehicles having a driver and at least one other passenger. Other methods for managing vehicular traffic include toll roads and car pool tax credits.

While extra-vehicular cameras have been implemented to assess tolls to vehicles on toll roads by automatically recognizing a license plate in a photograph of a vehicle as it passes a toll station, enforcement of occupancy requirements in HOV lanes has remained primarily a manual process performed by state and local law enforcement agencies. Unlike vehicle-identification systems that track owner information based on a vehicle's license plate, extra-vehicular camera-based systems are not able to easily determine the number of passengers in a vehicle due to multiple factors including glare and the inability to view some areas within the vehicle.

SUMMARY

The problems presented by existing systems and methods for managing vehicular traffic on a roadway are solved by the systems and methods of the illustrative embodiments described herein. In one embodiment, a system for managing vehicular traffic on a roadway includes an imaging sensor to sense an image within an interior of a vehicle. A processor is provided in communication with the imaging sensor to determine from the image an occupancy number representing the number of persons present in the interior of the vehicle. A communications unit is in in communication with the processor and configured to communicate with a receiving unit outside of the vehicle. The communications unit is configured to deliver the occupancy number to the receiving unit.

In another embodiment, a system for managing vehicular traffic on a roadway includes a sensing unit positioned within a vehicle traveling on the roadway, the sensing unit configured to determine occupancy data based on the number of passengers within the vehicle. An activator unit is positioned above or proximate the roadway and configured to activate the sensing unit. One or more receiving units are positioned above or proximate the roadway to receive occupancy data from the sensing unit. Upon activation by the activator unit, the sensing unit determines the occupancy data, stores the occupancy data, and then ceases further determination of occupancy data until activated by a subsequent activator unit.

In yet another embodiment, a system configured to manage vehicular traffic on a roadway includes at least one processor and at least one memory coupled to the at least one processor. The at least one memory stores instructions that when executed by the at least one processor performs operations including determining data based on the number of passengers within the vehicle, storing the data in the at least one memory, reporting the stored data to a first receiving unit, clearing the at least one memory to a cleared state after reporting to the first receiving unit, and determining battery status when a second receiving unit detects the at least one memory in the cleared state.

In still another embodiment, a system for managing vehicular traffic on a roadway includes a sensing unit positioned within a vehicle traveling on the roadway. The sensing unit is configured to determine occupancy data based on the number of passengers within the vehicle. An ambient light sensor is operatively associated with the sensing unit such that upon sensing an intensity of ambient light, an adjustment is made to the system to aid in the determination of occupancy data. The occupancy data is configured to be communicated to one or more receiving units positioned above or proximate the roadway.

In another embodiment, a system for managing vehicular traffic on a roadway includes a sensing unit positioned within a vehicle traveling on the roadway. The sensing unit is configured to determine occupancy data based on the number of passengers within the vehicle. An ambient temperature sensor is operatively associated with the sensing unit such that upon sensing an ambient temperature, an adjustment is made to the system to aid in the determination of occupancy data. The occupancy data is configured to be communicated to one or more receiving units positioned above or proximate the roadway.

In another embodiment, a system for managing vehicular traffic on a roadway includes a sensing unit having an infrared sensor positioned within a vehicle traveling on the roadway. The sensing unit is configured to determine occupancy data based on the number of passengers within the vehicle. A presence of a passenger is determined by monitoring for a desired number of movements within a particular field for a desired amount of time. The occupancy data is configured to be communicated to one or more receiving units positioned above or proximate the roadway.

In yet another embodiment, a system for managing vehicular traffic on a roadway includes a sensing unit having a passive infrared sensor positioned within a vehicle traveling on the roadway. The sensing unit is configured to determine occupancy data by sensing a first infrared signature with a first portion of the passive infrared sensor and a second infrared signature with a second portion of the passive infrared sensor. The first infrared signature is compared to the second infrared signature to determine if movement is detected. A presence of a passenger is determined by detecting movement. The occupancy data is configured to be communicated to one or more receiving units positioned above or proximate the roadway.

In another embodiment, a system for managing vehicular traffic on a roadway includes a sensing unit having an image sensor positioned within a vehicle traveling on the roadway. The sensing unit is configured to detect a facial characteristic and thus determine a presence of one or more faces in an interior of the vehicle. The sensing unit is configured to determine passenger occupancy data based on the presence of the one or more faces. The occupancy data is configured to be communicated to one or more receiving units positioned above or proximate the roadway.

In another embodiment, a system for managing vehicular traffic on a roadway includes a sensing unit positioned within a vehicle traveling on the roadway, the sensing unit configured to determine occupancy data based on the number of passengers within the vehicle. A motion or GPS sensor is positioned within the vehicle to determine movement of the vehicle and to activate the sensing unit upon determining movement. One or more receiving units is positioned above or proximate the roadway to receive occupancy data from the sensing unit.

In still another embodiment, a non-transitory computer readable medium includes computer executable instructions for managing vehicular traffic on a roadway. The computer executable instructions when executed cause one or more machines to perform operations comprising determining occupancy data based on the number of passengers within the vehicle, storing the occupancy data in the at least one memory, reporting the stored occupancy data to a first receiving unit, clearing the at least one memory to a cleared state after reporting to the first receiving unit, and determining low battery status when a second receiving unit detects the at least one memory in the cleared state.

Other objects, features, and advantages of the invention will become apparent with reference to the drawings, detailed description, and claims that follow.

BRIEF DESCRIPTION OF THE DRAWINGS

The disclosed embodiments and additional advantages thereof are best understood by referring to FIGS. 1-6 of the drawings, like numerals being used for like and corresponding parts of the various drawings.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the disclosed systems and methods, and it is understood that other embodiments may be utilized and that logical structural, mechanical, electrical, and chemical changes may be made without departing from the spirit or scope of the disclosure. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "include," "including," "comprise," and "comprising" are used in an open-ended fashion, and thus specify the presence of stated features, integers, steps, operations, elements, and/or components, but do not preclude the presence or addition of one or more other features, integers, steps, operations, elements, components, and/or groups thereof. Unless otherwise indicated, as used throughout this document, "or" does not require mutual exclusivity.

Determining vehicle occupancy for toll-based roadways and managed lanes is useful in setting occupancy-based tolls in order to control roadway congestion and more efficiently use the roadways. When a toll authority is enabled to accurately determine the occupancy status of each vehicle, toll incentives may be offered to vehicle operators who transport larger numbers of occupants in their vehicles, while penalties may be accurately assessed to those who utilize infrastructure such as HOV lanes without meeting the occupancy requirements.

The embodiments described herein include devices, systems, or methods that may be installed or carried within an automobile or other vehicle to determine the number of vehicle occupants within a specified transmission range and communicate occupancy data to a toll-collection infrastructure. At least one embodiment employs a radio-frequency identification (RFID) infrastructure commonly used in automated toll collection today, but other embodiments may use other forms of wireless communication such as, but not limited to, Bluetooth, Wi-Fi, infrared, or other communication protocols.

Figure 1:
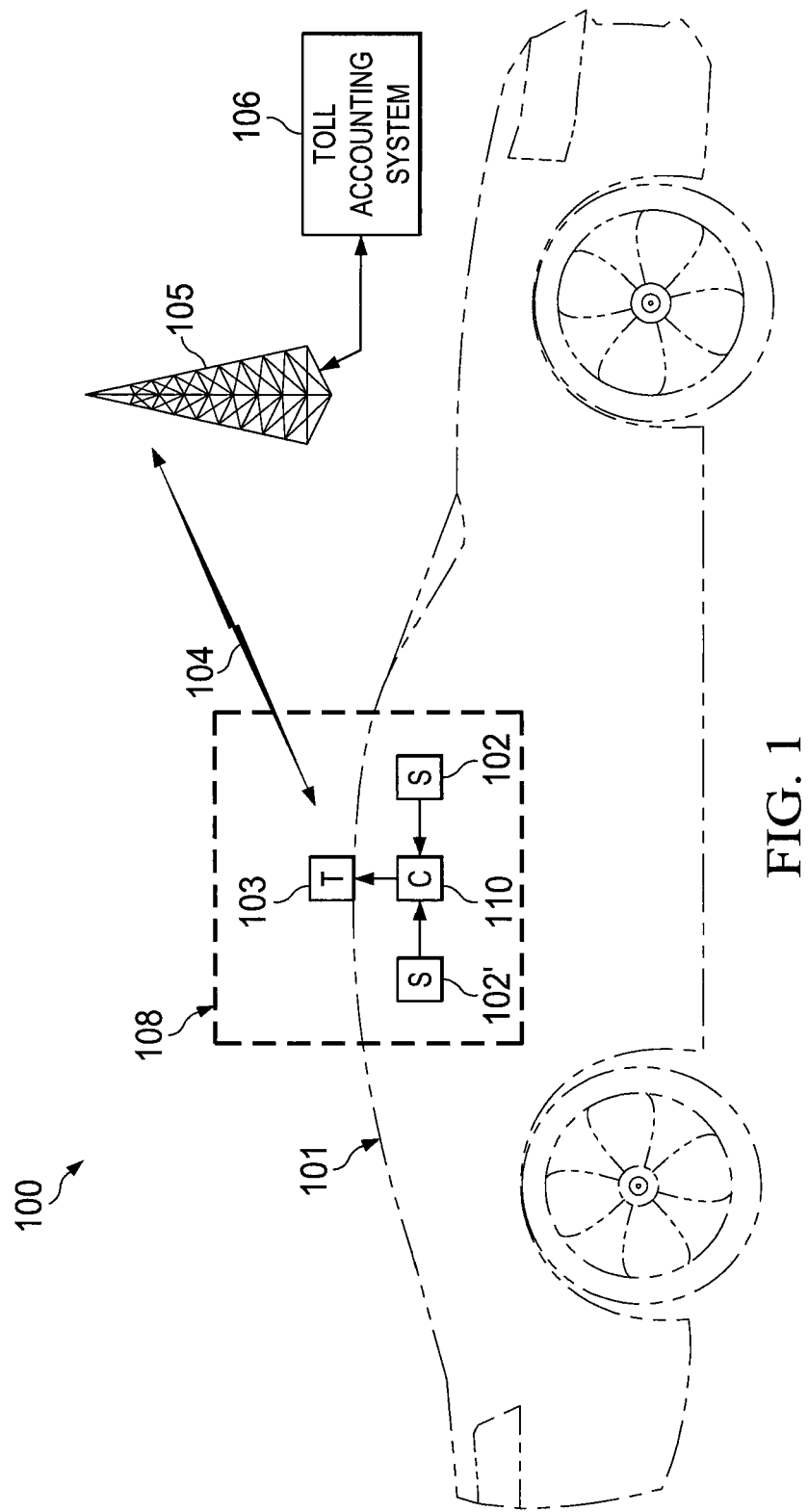
FIG. 1 illustrates a schematic view of a vehicle equipped with a sensing unit, a control unit and a communications unit that cooperate to determine occupancy data associated with the vehicle and communicate the occupancy data to a toll tower or a toll accounting system according to an illustrative embodiment.

Referring now to FIG. 1, a schematic view of an illustrative embodiment of a system 100 for managing vehicular traffic on a roadway includes a sensing unit 108 positioned or carried within a vehicle 101. The sensing unit 108 may be positioned in an interior of the vehicle. In one embodiment, the sensing unit 108 is positioned such that the sensing unit is capable of viewing each area in the vehicle 101 which a passenger may occupy, e.g. a front passenger seat, a rear driver side, a rear middle or a rear passenger side seat. For cost purposes, it is not necessary to determine the presence of the driver or implement an occupancy detector for the driver, as it can be reasonably presumed that each moving vehicle which is travelling on a roadway is at least occupied by a driver. However, in some embodiments, determination of occupancy data may include determination of the number of persons occupying the vehicle including the driver. In some embodiments disclosed herein, the term "passenger" may include any occupant of the vehicle including the driver.

In an embodiment, the sensing unit 108 includes one or more sensors 102, 102' and may be positioned within the vehicle 101 such that the one or more sensors 102, 102' have an unobstructed view of the one or more passenger seats. The one or more sensors 102, 102' may be any sensing device that is capable of detecting or sensing information that may be used to determine the presence of one or more passengers in the vehicle 101. A variety of sensing devices or methods may be used alone or in concert to determine occupancy inside the vehicle, including passive infrared motion sensor(s), ultrasonic motion sensor(s), thermopile sensor(s), infrared-sensitive digital camera(s), image sensor (s), and visible-light or other passive or active sensor(s) to measure body motion or body temperature at a distance. Further, detection of human body or facial characteristics by the one or more sensors 102, 102' may also be employed to assist in determining vehicle occupancy.

Upon collection of sensor data from sensors 102, 102', the sensor data is communicated to a control unit 110 having electronic circuits or a processor employing software to determine the presence of a live human and distinguish it from an object or an animal. The processor may also determine, if passengers are present, the total number of passengers within the vehicle.

The control unit 110 may then communicate the occupancy data to a communications unit 103 that communicates 104 the information to a receiving unit 105 deployed at sites along the roadway using a wireless communications technology such as RFID. The receiving unit 105 may include a tower, an antenna, a receiver, a transmitter, or other devices associated with toll-based infrastructure. The receiving unit 105 may be positioned above the roadway or otherwise proximate the roadway to receive data from the communications unit 103. Upon receipt of data from the communications unit 103, the receiving unit 105 may communicate with a toll accounting system 106 that is capable of billing tolls or other fees to a user of the system 100. The embodiments described herein may be able to make use of existing RFID technology and systems already deployed for toll collection and other purposes by using the same RFID frequencies, modulation methods and data protocols.

Additional sensor units 102' may be aimed at or placed near the rear seat to make the same determination for that location. If precise seat occupancy is needed, then it may be necessary to deploy or aim a sensor towards that location. Otherwise, the sensor field of view could encompass a wider area of the rear seat and provide an indication of occupancy, but may be not an exact count.

The communications unit 103, control unit 110 and one or more sensors 102, 102' described above may be packaged together or separately. If packaged together, each of the components may be considered a part of the sensing unit 108. Alternatively, one or more of the components may be packaged separately from the sensing unit 108. If packaged together or separately, then either wired or wireless communication methods may be used to transfer information between the sensors, control unit and communications unit.

It is desired that installation and operation be simple and reliable, therefore at least one embodiment includes the sensor, control unit and communications unit packaged together and operating on battery power or solar power. The combination of sensor, control unit and communications unit may be positioned on the front dashboard or windshield of the vehicle, or anywhere else within the vehicle, such that the communications unit has an RF or other communications path outside the vehicle and the sensor has a view towards the passenger and rear seats. In an embodiment with multiple sensors, it may be desirable to have the sensors positioned at different locations within the vehicle. For example, one sensor may be included with the primary sensing unit mounted on the front windshield or dashboard of the vehicle, while a second sensor is positioned toward a rear portion of the vehicle to better observe occupancy in the rear seats.

Figure 2:
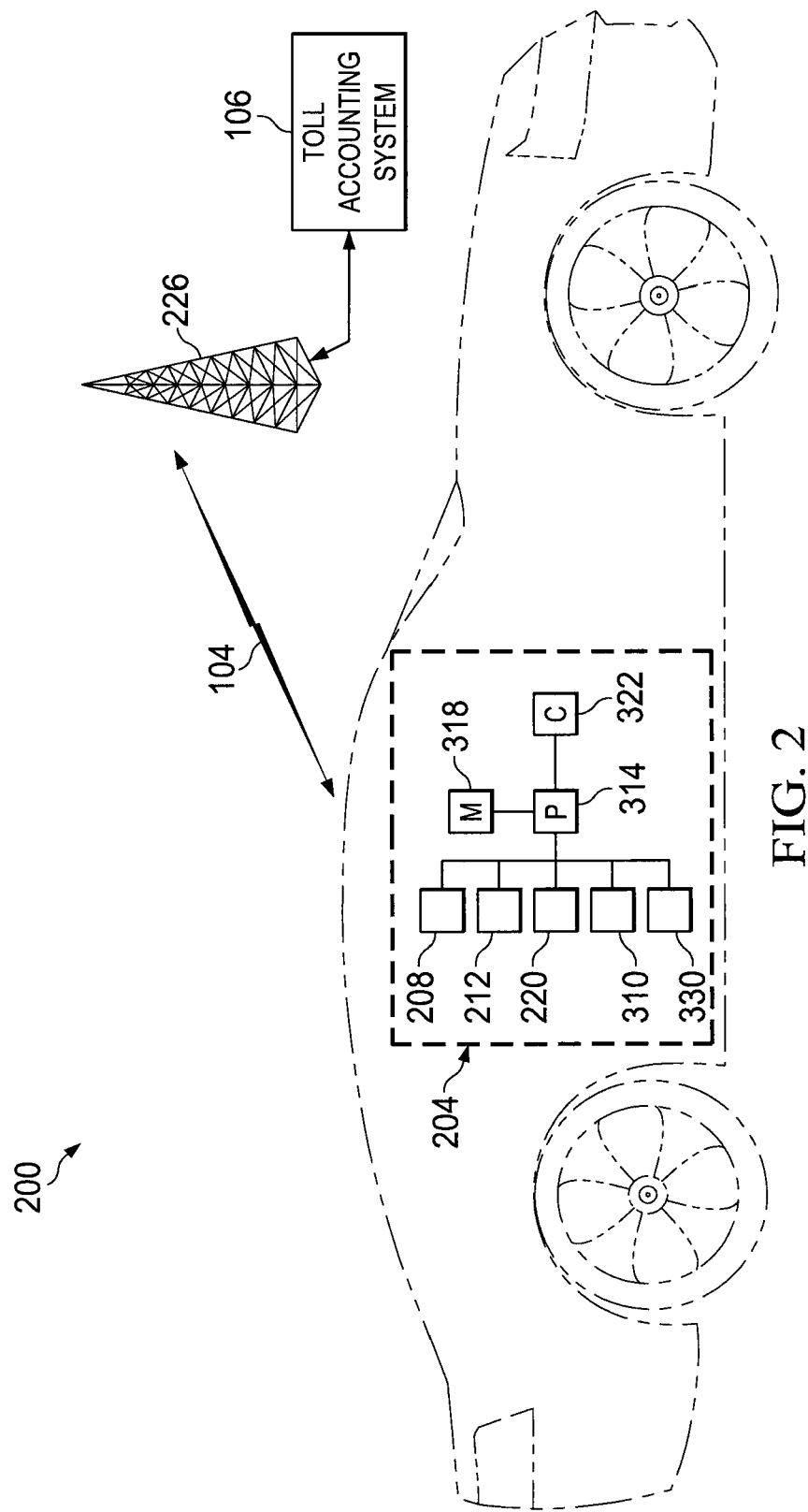
FIG. 2 illustrates a schematic view of a system for managing vehicular traffic on a roadway according to an illustrative embodiment, the system having a sensing unit.

FIG. 2 illustrates a schematic view of a system 200 for managing vehicular traffic on a roadway according to an illustrative embodiment. The system 200 may be similar in operation to system 100 of FIG. 1 the system may be used with a vehicle 201 traveling along the roadway to assist in the determination of occupancy associated with the vehicle. The system 200 includes a sensing unit 204 positioned within the vehicle, the sensing unit 204 configured to determine occupancy data based on the number of passengers within the vehicle 201. The system 200 may include an ambient light sensor 208 operatively associated with the sensing unit 204 or a control unit such that upon sensing an intensity of ambient light, an adjustment may be made to the system to aid in the determination of occupancy data. For example, if excessive ambient light is detected, such as may be the case when the ambient light sensor is exposed to direct and intense sunlight, the sensitivity of sensors within the sensing unit 204 may be decreased to prevent false designations of passengers, which could decrease the accuracy of determined occupancy data. In another embodiment, adjustment to the system may include adjusting a shutter speed of a shutter (not shown) associated with the sensing unit 204. The shutter may be used to regulate exposure of the sensing unit 204 to ambient light. In still another embodiment, the system 200 may include an illumination source 212, and the adjustment to the system 200 may include adjusting an output of the illumination source 212. In a particular example, the ambient light sensor 208 may sense that an insufficient amount of ambient light is present to make an accurate determination of occupancy data. In response, the output of the illumination source 212 may be increased to improve the ambient lighting conditions. The illumination source 212 may be configured to illuminate the interior of the vehicle 201 with visible light or light in the infrared spectrum.

The ambient light sensor 208 may be particularly useful when the sensor within the sensing unit 204 is an infrared sensor that measures differential heat signatures (i.e., movement) associated with passengers. As an alternative to or in addition to the ambient light sensor 208, the system 200 may include an ambient temperature sensor 220 operatively associated with the sensing unit 204 such that upon sensing an ambient temperature, an adjustment may be made to the system 200 to aid in the determination of occupancy data. For example, if excessive ambient temperature is detected, such as may be the case when the vehicle 201 is operated during a hot day or the vehicle 201 has been sitting parked for a period of time, the sensitivity of sensors within the sensing unit 204 may be decreased to prevent false designations of passengers, which could decrease the accuracy of determined occupancy data. In another embodiment, adjustment to the system 200 may include delaying sensing by the sensing unit 204 until the ambient temperature is less than or equal to an acceptable temperature. For example, if the average temperature of a person is 98.6 degrees Fahrenheit, and determination of the presence of a person in the vehicle is determined by sensing a heat signature of the person, it may be beneficial for the ambient temperature within the vehicle to be less than 98.6 degrees Fahrenheit prior to attempting to determine occupancy.

Following the determination of occupancy data by the sensing unit 204, the system is configured to communicate the occupancy data to a receiving unit 226 positioned above or proximate the roadway on which the vehicle is traveling.

The receiving unit 226 is similar in function to the receiving unit 105 described with reference to FIG. 1, and the receiving unit may in some embodiments include a tower, an antenna, a receiver, a transmitter, or other devices associated with toll-based infrastructure. Alternatively, the receiving unit 226 may be a satellite or any other device capable of querying or receiving occupancy data from the sensing unit 204.

While the system 200 may be described as including the sensing unit 204 and various additional components (e.g., ambient light sensor, ambient temperature sensor) that are installed within or onboard the vehicle 201, in another embodiment, the system 200 may also include the receiving unit 226.

Figure 3:
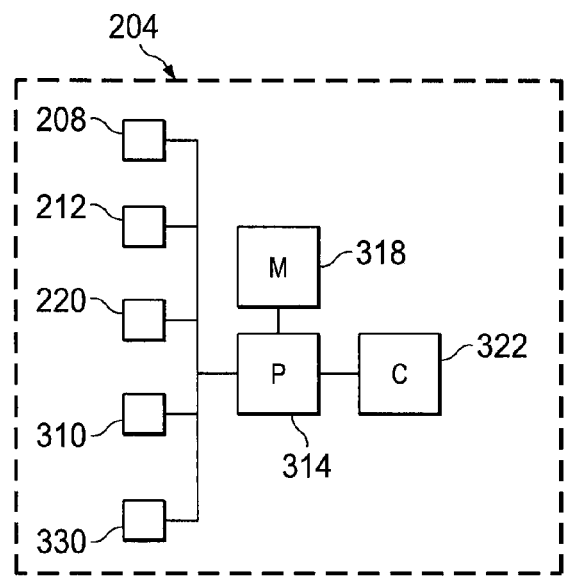
FIG. 3 illustrates a schematic view of the sensing unit of FIG. 2.

Referring still to FIG. 2, but also to FIG. 3, the sensing unit 204 includes a sensor 310 or an array of sensors configured to detect the presence of one or more passengers in the vehicle 201. The sensing unit 204 may be any type of computing device such as, but not limited to, a personal computer, a server system, a client system, a laptop, a tablet, and a smartphone. The sensing unit 204 may include a processing unit 314 in communication with the sensor 310 and a memory unit 318 in communication with processing unit 314. The processing unit 314 may further be in communication with a communication unit 322. Each of the components (sensor 310, processing unit 314, memory unit 318, and communication unit 322), as well as additional components and sensors may be considered a part of the sensing unit 204 and may be contained together in a common housing. Alternatively, any of the components may be housed separately from the other components, such as for example a second sensor that is positioned in a second location in the vehicle.

The sensor 310 may be configured to sense the presence of a passenger by monitoring a region (or regions) within the vehicle for a desired number of movements within a desired amount of time. Multiple sensors may be employed, and each sensor may be responsible for monitoring a particular region of the vehicle interior. For example, the sensor 310 may be configured to monitor a right rear passenger region of the vehicle 201. The sensor 310 and processing unit 314 may together determine occupancy data for that region of the vehicle if movement within the region is sensed within a particular sample period. The occupancy data in some embodiments may simply be a number that is representative of the occupancy of a region of the vehicle or the entire interior of the vehicle. In one embodiment, the sensor 310 may monitor for two movements within the region within a five second period. Multiple scenarios may be envisioned in which the number of movements or the period of time varies from this example.

In another embodiment, the sensor 310 may be a passive infrared sensor configured to determine occupancy data by sensing a first infrared signature with a first portion of the passive infrared sensor and a second infrared signature with a second portion of the passive infrared sensor. In some cases, the first portion and the second portion may be individual and separate passive infrared sensors. The first infrared signature is compared to the second infrared signature to determine a differential infrared signature, thereby determining if movement has occurred. A presence of a passenger is determined by detecting movement with the sensor 310.

In another embodiment, the sensor 310 is configured to detect near infrared or visible light, and a second sensor 330 is configured to detect long wave infrared.

In still another embodiment, the sensor 310 is an image sensor configured to detect a facial characteristic and thus determine a presence of one or more faces in the interior of the vehicle 201. More particularly, the sensor 310 may be a charge-coupled device or a complementary metal-oxide-semiconductor (CMOS) sensor. The sensing unit 204 in this embodiment may include a lens to focus an optical image on the sensor 310 or may include at least one mirror to reflect the optical image toward the sensor 310. The facial characteristics detected by the sensor 310 may include the nose, eyes, or mouth of a passenger.

When sensor 310 is an image sensor, the sensor 310 communicates data to the processing unit 314. The processing unit 314 then communicates data to the communication unit 322. It is desirable in some embodiments to transmit only data representing the number of faces detected in the vehicle, and thus limit or prevent any transmission of the image itself or any identifying information about the faces detected in the image. This limitation of data transmission may occur as data is transferred from the sensor 310 to the processing unit 314, from the processing unit 314 to the communications unit 322, or from the communications unit 322 to the receiving unit. Such a limitation on data transfer will maintain privacy for passengers in the event that an image sensor is used to determine occupancy data.

The processing unit 314 may be or include any type or any number of single core or multi-core processors capable of executing instructions for performing the features and functions of the disclosed embodiments. Memory unit 318 includes volatile memory that stores currently executing instructions/data or instructions/data that are prefetched for execution. In some embodiments, additional non-volatile memory may be provided for storing persistent data.

For example, in accordance with the disclosed embodiments, the non-volatile memory may permanently store the executable code/instructions associated with occupancy data determination as disclosed herein. The instructions associated with the occupancy data determination may be loaded from non-volatile memory to volatile memory during execution by the processing unit 314 for performing the disclosed embodiments.

The communication unit 322 enables the sensing unit 204 to communicate with the receiving unit. The communication unit 322 may include a transmitter and receiver to allow communication with the receiving unit, or alternatively with a cellular phone or network located within the vehicle. Communication between the communication unit 322 and cellular phone or network may be accomplished using any appropriate wired or wireless communication protocol, such as for example by Bluetooth or Wi-Fi protocols. In some embodiments, the communication unit 322 includes an active portion and a passive portion. The active portion relies upon onboard battery power, vehicle power, solar power, or other power to communicate, whether said communication is between the communication unit 322 and the receiving unit or between the communication unit and other components of the sensing unit 204. The passive portion of the communication unit 322 receives power from the receiving unit, an activator unit, or other device associated with the toll-based infrastructure. Since the passive portion may be externally powered, communication associated with this portion of the communication unit 322 continues even when onboard battery power or vehicle power are not available.

Figure 4:
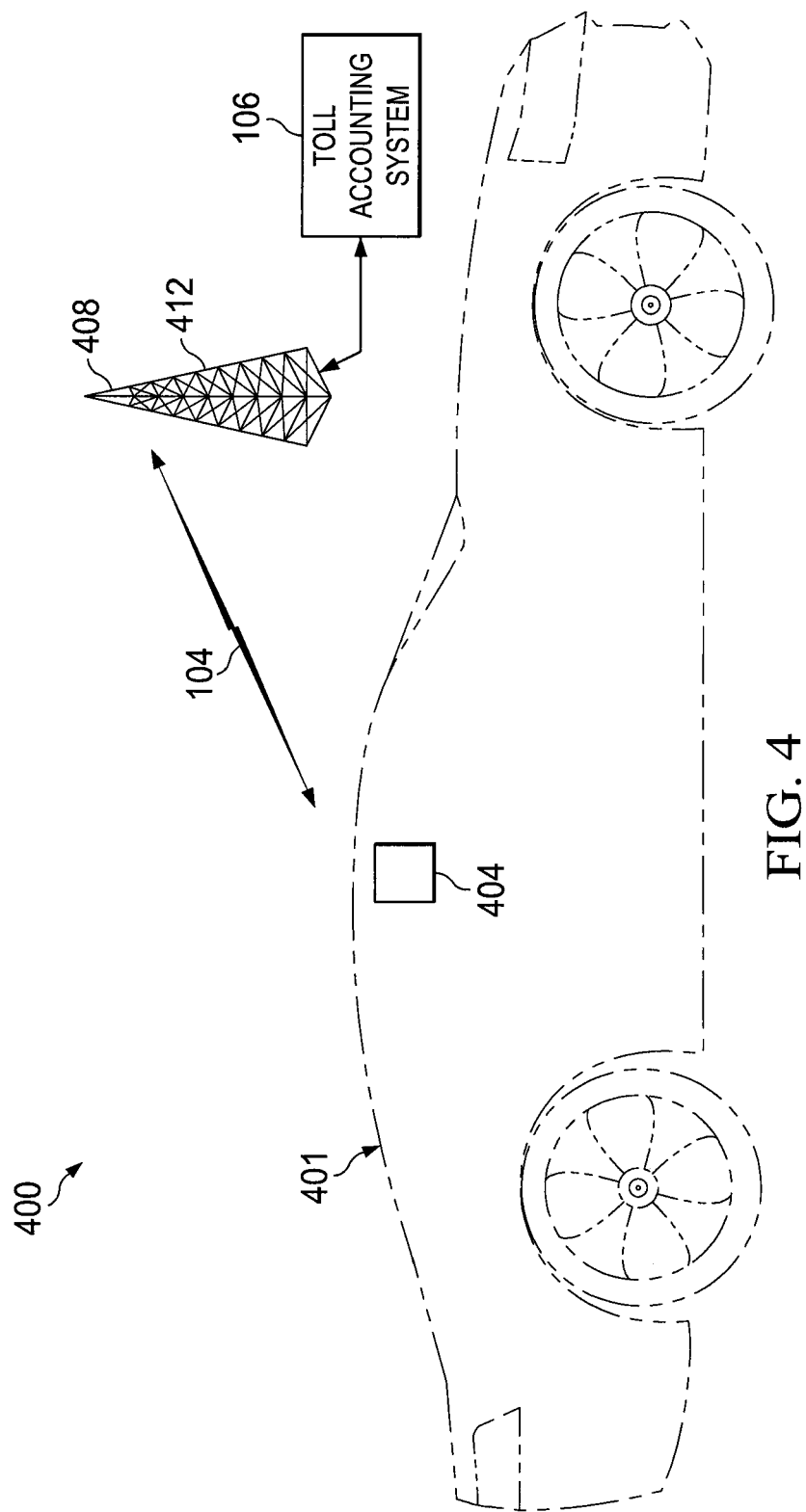
FIG. 4 illustrates a schematic view of a system for managing vehicular traffic on a roadway according to an illustrative embodiment.

FIG. 4 illustrates a schematic view of a system 400 for managing vehicular traffic on a roadway according to an illustrative embodiment. The system 400 may be similar in operation to system 100 of FIG. 1 and is meant to be used with a vehicle 401 traveling along the roadway to assist in the determination of occupancy associated with the vehicle. The system 400 includes a sensing unit 404 positioned within the vehicle, the sensing unit 404 configured to determine occupancy data based on the number of passengers within the vehicle 401. The sensing unit 404 may be similar in structure, use, and operation to the sensing unit 204 described previously with reference to FIGS. 2 and 3. The system 400 may include an activator unit 408 and a receiving unit 412 positioned above or proximate the roadway. The activator unit 408 is configured to activate the sensing unit 404, and the receiving unit 412 is configured to receive occupancy data from the sensing unit 404. The activator unit 408 may be a transmitter, magnetic field generator, electric field generator, light source, or any other device capable of sending a signal, power, light, a magnetic field, an electric field, or other communication (e.g., beam power) to the sensing unit 404. The activator unit 408 in some embodiments may communicate with a passive portion of the sensing unit 404 in such a way that the sensing unit 404, or its associated communication unit, may be activated and may return data to activator unit 408 or receiving unit 412 even when the sensing unit 404 has lost onboard battery power or access to vehicle power.

Upon activation of the sensing unit 404 by the activator unit 408, the sensing unit determines the occupancy data, stores the occupancy data, and then ceases further determination of occupancy data until activated by a subsequent activator unit. This configuration of the system prevents unnecessary power consumption that would be caused by the sensing unit regularly and often determining occupancy.

As an alternative to use of an activator unit 408 to alert the sensing unit 404 as to when occupancy data should be determined, the system 400 may instead incorporate a global positioning system (GPS) sensor or other motion sensor that "awakes" or activates the sensing unit 404 when the GPS sensor or motion sensor determines that the sensing unit 404 is in motion or is nearing a receiving unit.

Figure 5:
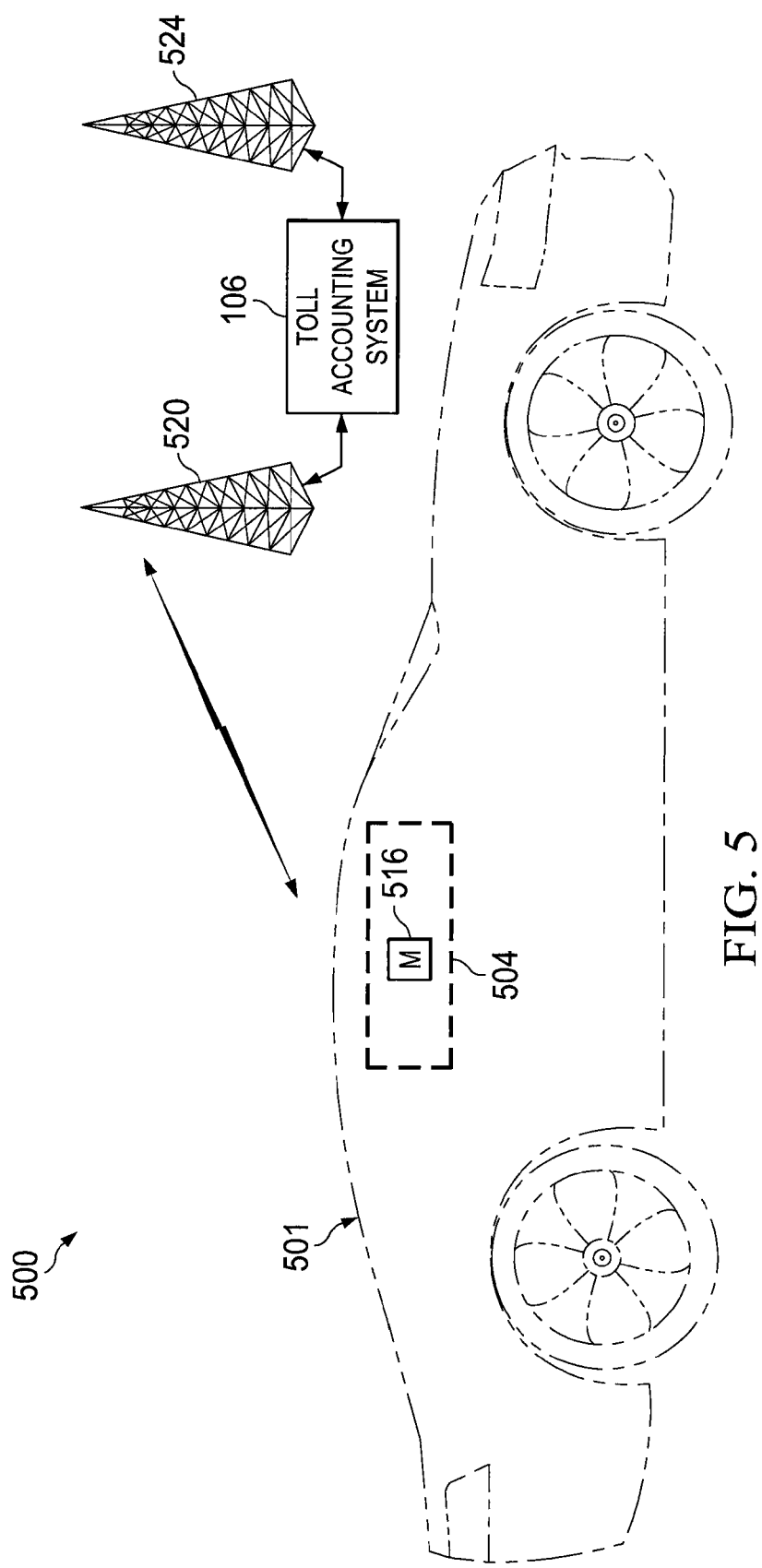
FIG. 5 illustrates a schematic view of a system for managing vehicular traffic on a roadway according to an illustrative embodiment.

FIG. 5 illustrates a schematic view of a system 500 for managing vehicular traffic on a roadway according to an illustrative embodiment. The system 500 may be similar in operation to system 100 of FIG. 1 and is meant to be used with a vehicle 501 traveling along the roadway to assist in the determination of occupancy associated with the vehicle. The system 500 includes a sensing unit 504 positioned within the vehicle, the sensing unit 504 configured to determine occupancy data based on the number of passengers within the vehicle 501, store the occupancy data in a memory unit 516, and report the stored occupancy data to a first receiving unit or activator unit 520 external to the vehicle 501. The memory unit 516 is configured to be cleared to a cleared state by the first receiving unit or activator unit following communication of the stored occupancy data by the sensing unit 504. Subsequent detection of the memory unit 516 in the cleared state by a second receiving unit 524 indicates that the sensing unit 504 failed to write new occupancy data to the memory unit 516 after the memory unit 516 was cleared by the first receiving unit or activator unit 520. This failure to write by the sensing unit 504 likely indicates that a battery associated with the sensing unit 504 is low in power that power has expired. By detecting the low battery status, an operator of the system 500 or of the receiving units 520, 524 is able to notify the user of the sensing unit 504 that the battery is low or expired. Notification may be provided by Short Message Service (SMS), electronic mail, telephony, common carrier, and mail.

Figure 6:
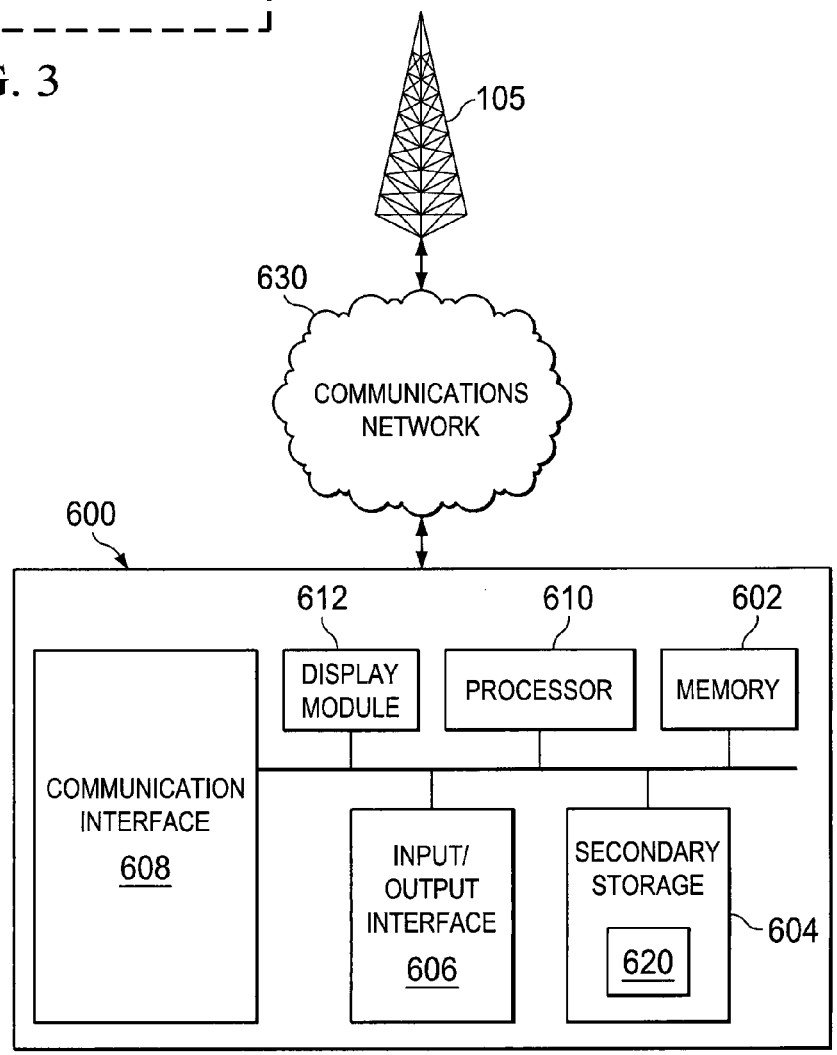
FIG. 6 is a block diagram illustrating an embodiment of a system for managing vehicular traffic on a roadway.

FIG. 6 is a block diagram illustrating an embodiment of a system 600 for implementing the features and functions of the disclosed embodiments, including those of managing vehicular traffic on a roadway. The system 600 may be any type of computing device such as, but not limited to, a personal computer, a server system, a client system, a laptop, a tablet, and a smartphone. The system 600 includes, among other components, a processor 610, and main memory 602, and a communication interface module 608. Other optional components include secondary storage unit 604, and an input/output interface module 606. The processor 610 may be any type or any number of single core or multi-core processors capable of executing instructions for performing the features and functions of the disclosed embodiments.

For systems having the input/output interface module 606, the input/output interface module 606 enables the system 600 to receive user input (e.g., from a keyboard and mouse) and output information to one or more devices such as, but not limited to, printers, external data storage devices, and audio speakers. The system 600 may optionally include a separate display module 612 to enable information to be displayed on an integrated or external display device. For instance, the display module 612 may include instructions or hardware (e.g., a graphics card or chip) for providing enhanced graphics, touchscreen, and/or multi-touch functionalities associated with one or more display devices.

Main memory 602 is volatile memory that stores currently executing instructions/data or instructions/data that are prefetched for execution. The secondary storage unit 604 is non-volatile memory for storing persistent data. The secondary storage unit 604 may be or include any type of data storage component such as a hard drive, a flash drive, or a memory card. In one embodiment, the secondary storage unit 604 stores the computer executable code/instructions and other relevant data for enabling a user to perform the features and functions of the disclosed embodiments.

For example, in accordance with the disclosed embodiments, the secondary storage unit 604 may permanently store the executable code/instructions associated with an occupancy data determination application 620 for performing the above-described methods. The instructions associated with the occupancy data application 620 are loaded from the secondary storage unit 604 to main memory 602 during execution by the processor 610 for performing the disclosed embodiments.

The communication interface module 608 enables the system 600 to communicate with the communications network 630, such as a communications network associated with the receiving unit 105 of FIG. 1. For example, the communications interface module 608 may include a network interface card and/or a wireless transceiver for enabling the system 600 to send and receive data through the communications network 630 and/or directly with other devices such as the receiving unit 105.

The communications network 630 may be any type of network including a combination of one or more of the following networks: a wide area network, a local area network, one or more private networks, the Internet, a telephone network such as the public switched telephone network (PSTN), one or more cellular networks, and wireless data networks. The communications network 630 may include a plurality of network nodes (not depicted) such as routers, network access points/gateways, switches, DNS servers, proxy servers, and other network nodes for assisting in routing of data/communications between devices.

While specific details about the above embodiments have been described, the above hardware and software descriptions are intended merely as example embodiments and are not intended to limit the structure or implementation of the disclosed embodiments. For instance, although many other internal components of the system 600 are not shown, those of ordinary skill in the art will appreciate that such components and their interconnection are well known.

In addition, certain aspects of the disclosed embodiments, as outlined above, may be thought of as "products" or "articles of manufacture" typically in the form of executable code and/or associated data that is carried on or embodied in a type of tangible non-transitory machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the executable code.

Additionally, the block diagrams and figures illustrate the architecture, functionality, and operation of possible implementations of systems, methods and computer program products according to various embodiments of the disclosure. It should also be noted that, in some alternative implementations, the functions noted herein may occur out of the order noted. For example, two steps disclosed in succession may, in fact, be executed substantially concurrently, or the steps may sometimes be executed in the reverse order, depending upon the functionality involved. It will also be noted that each system and method disclosed, and combinations thereof, may be implemented by special purpose hardware-based systems that perform the specified functions or acts, or combinations of special purpose hardware and computer instructions.

It should also be recognized by those skilled in the art that certain embodiments utilizing a microprocessor executing a logical process may also be realized through customized electronic circuitry performing the same logical process(es).

It should be apparent from the foregoing that an invention having significant advantages has been provided. While the invention is shown in only a few of its forms, it is not limited to only these embodiments but is susceptible to various changes and modifications without departing from the spirit thereof.

We claim:

1. A system configured to manage vehicular traffic on a roadway, comprising:
    at least one processor; and
    at least one memory coupled to the at least one processor and storing instructions that when executed by the at least one processor performs operations comprising:
        determining data based on the number of passengers within the vehicle;
        storing the data in the at least one memory;
        reporting the stored data to a first receiving unit;
        clearing the at least one memory to a cleared state after reporting to the first receiving unit; and
        determining battery status when a second receiving unit detects the at least one memory in the cleared state.

2. The system of claim 1, wherein the data is occupancy data.

3. The system of claim 1, further comprising the first and second receiving units.

4. The system of claim 1, wherein the receiving unit further comprises an activator unit that activates a passive portion of the system to access and return the stored occupancy data.

5. The system of claim 4, wherein the activator unit provides the power necessary to place the at least one memory in the cleared state.

6. The system of claim 4, wherein the system further comprises an active portion that is capable of determining the occupancy data and storing the occupancy data in the at least one memory.

7. The system of claim 1, wherein upon determination of the low battery status, the operations further comprise notifying a user of the sensing unit of the low battery status.

8. The system of claim 7, wherein the user is notified by at least one of Short Message Service (SMS), electronic mail, telephony, common carrier, and mail.

* * * * *